(12) United States Patent
Rajaa

(10) Patent No.: US 9,052,935 B1
(45) Date of Patent: Jun. 9, 2015

(54) SYSTEMS AND METHODS FOR MANAGING AFFINITY RULES IN VIRTUAL-MACHINE ENVIRONMENTS

(71) Applicant: Symantec Corporation, Mountain View, CA (US)

(72) Inventor: Subash Rajaa, Pune (IN)

(73) Assignee: Symantec Corporation, Mountain View, CA (US)

( * ) Notice: Subject to any disclaimer, the term of this patent is extended or adjusted under 35 U.S.C. 154(b) by 228 days.

(21) Appl. No.: 13/686,330

(22) Filed: Nov. 27, 2012

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| 8,782,242 B2 * | 7/2014 | Ahmad et al. ................ 709/226 |
| 2012/0216196 A1 * | 8/2012 | Kern .................................. 718/1 |
| 2013/0097464 A1 * | 4/2013 | Ahmad et al. ............... 714/47.1 |
| 2013/0311824 A1 * | 11/2013 | Ji et al. ............................ 714/15 |

* cited by examiner

*Primary Examiner* — Diem Cao
(74) *Attorney, Agent, or Firm* — ALG Intellectual Property, LLC

(57) ABSTRACT

A computer-implemented method for managing affinity rules in virtual-machine environments may include (1) identifying a first application configured to run on a first virtual machine, (2) identifying a second application configured to run on a second virtual machine, (3) identifying an application affinity rule between the first application and the second application, the application affinity rule indicating whether the first application and the second application should run on a same hypervisor within a plurality of hypervisors, and (4) selecting, based at least in part on which hypervisor among the plurality of hypervisors is running the first application, a hypervisor from among the plurality of hypervisors on which to run the second application that satisfies the application affinity rule between the first application and the second application. Various other methods, systems, and computer-readable media are also disclosed.

14 Claims, 16 Drawing Sheets

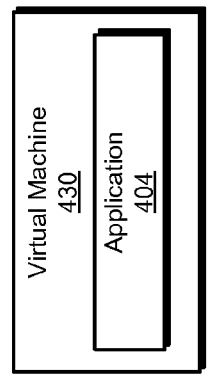
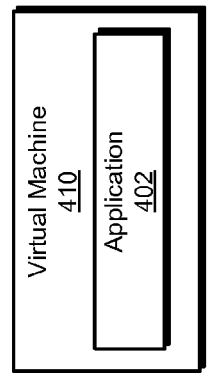
FIG. 4

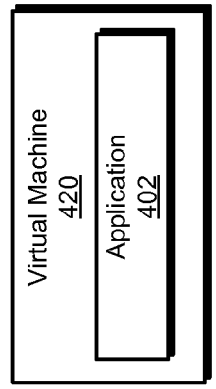
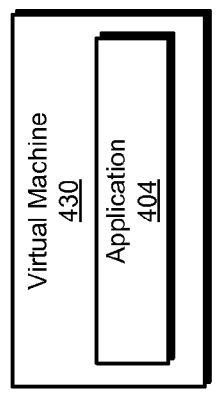
FIG. 5

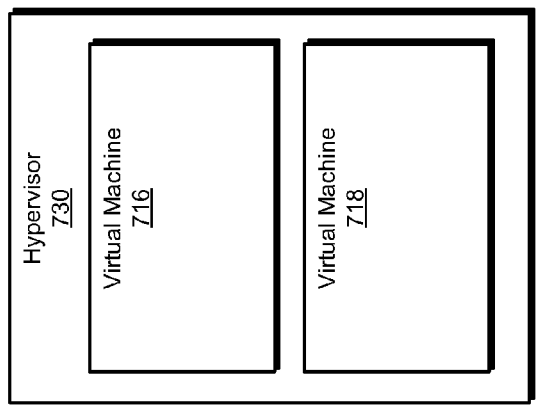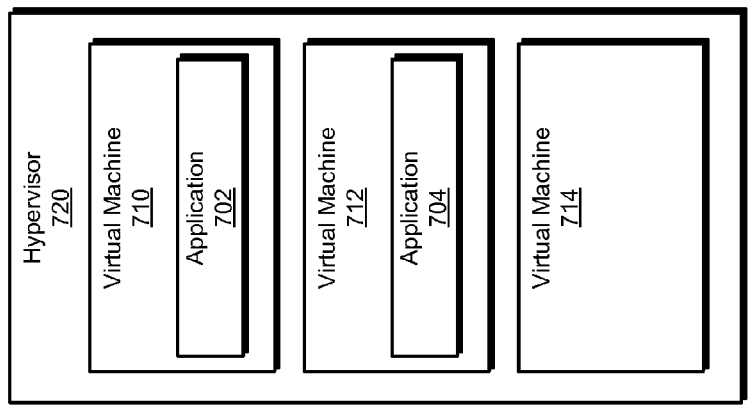
FIG. 7

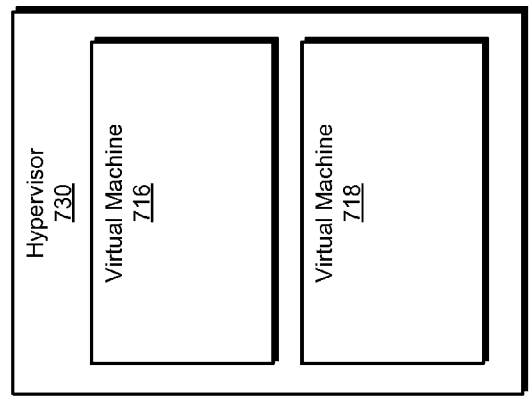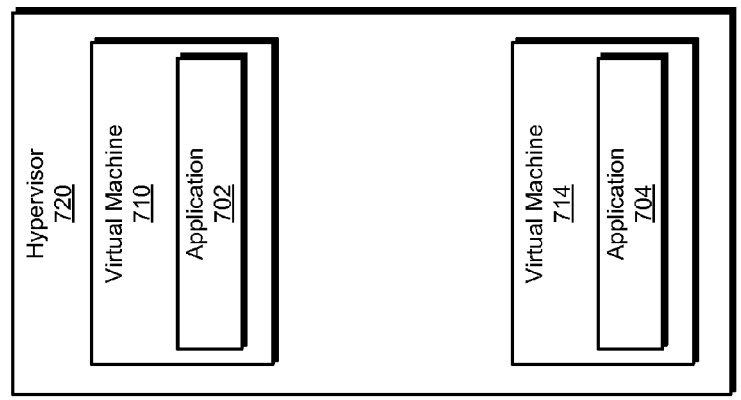
FIG. 8

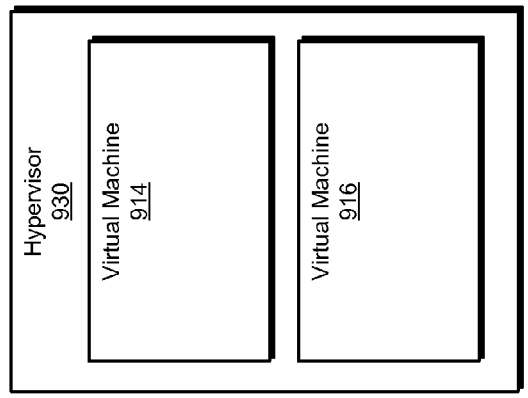
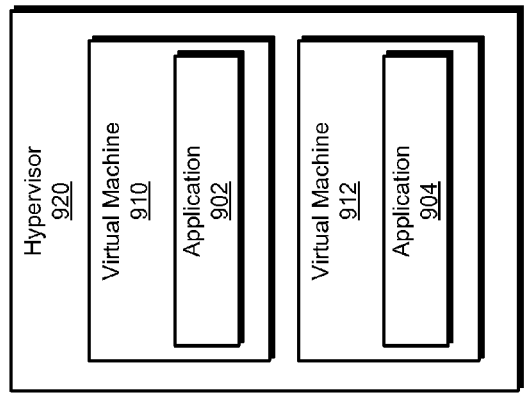
FIG. 9

SYSTEMS AND METHODS FOR MANAGING AFFINITY RULES IN VIRTUAL-MACHINE ENVIRONMENTS

BACKGROUND

Application availability and disaster recovery are two significant issues facing Information Technology (IT) administrators. Whether from physical failure, human error, lack of computing resources, or a system crash, application unavailability is inevitable without an appropriate high-availability and/or disaster-recovery solution.

Today, IT administrators are increasingly relying on virtualization technologies to provide application high availability and disaster recovery in order to simplify management of their IT infrastructures. Typical server virtualization technologies may enable multiple virtualized servers to concurrently run on the same physical host (e.g., hypervisor) as virtual machines, which may reduce the number of physical machines that IT administrators must manage and maintain. Virtualization technologies may provide application high availability and disaster recovery by enabling virtual machines that run applications to run on any of a plurality of hypervisor and/or move from one of the plurality of hypervisors to another (e.g., as a way to balance virtual-machine resource utilization across the plurality of hypervisors and/or as a way to restart virtual machines that have failed).

Because virtual machines may move from one hypervisor to another, typical virtualization technologies may implement affinity rules to allow an IT administrator to indicate whether two virtual machines should run on the same hypervisor and/or different hypervisors (e.g., for application performance or disaster recovery purposes). For example, an IT administrator may create an affinity rule between a virtual machine running a web server and a virtual machine running a database that is accessed by the web server to ensure that both virtual machines are placed on the same hypervisor, which may reduce the latency of network traffic flowing between the web server and the database. In another example, the IT administrator may create an anti-affinity rule between two virtual machines that are running instances of the same database (e.g., a virtual machine running a database instance acting as a master and another virtual machine running a database instance acting as a slave) to ensure that the two virtual machines run on separate hypervisors so that the database remains functional in the event that one of the hypervisors running the two database instances fails.

Unfortunately, managing affinity and anti-affinity rules between virtual machines may become more complicated in virtual-machine environments in which applications may move among virtual machines. For example, another technology used to provide application high availability and disaster recovery may include a cluster of servers that is capable of running one or more applications. If an application running within the cluster fails (e.g., as a result of the failure of the server on which the application runs), the application may be restarted on another server within the cluster. In some instances, a cluster may be implemented within a virtual-machine environment (e.g., as an in-guest cluster). However because applications may move from one virtual machine to another, an IT administrator may be unable to use static virtual-machine affinity and/or anti-affinity rules to ensure that two applications run on the same hypervisor or different hypervisors, which may result in reduced application performance and/or disaster recovery ability. Accordingly, the instant disclosure identifies a need for additional and improved systems and methods for managing affinity rules in virtual-machine environments.

SUMMARY

As will be described in greater detail below, the instant disclosure generally relates to systems and methods for managing affinity rules in virtual-machine environments. In one example, a computer-implemented method for managing affinity rules in virtual-machine environments may include (1) identifying a first application configured to run on a first virtual machine that may be configured to run on one of a plurality of hypervisors, (2) identifying a second application configured to run on a second virtual machine that may be configured to run on one of the plurality of hypervisors, (3) identifying an application affinity rule between the first application and the second application that indicates whether the first application and the second application should run on a same hypervisor within the plurality of hypervisors, and (4) selecting a hypervisor from among the plurality of hypervisors on which to run the second application that satisfies the application affinity rule between the first application and the second application based at least in part on which hypervisor among the plurality of hypervisors is running the first application.

In one embodiment, the step of selecting the hypervisor from among the plurality of hypervisors on which to run the second application may include selecting a hypervisor from among the plurality of hypervisors on which to run the second virtual machine that satisfies the application affinity rule between the first application and the second application.

In some embodiments, the step of selecting the hypervisor on which to run the second virtual machine may include creating a virtual-machine affinity rule between the first virtual machine and the second virtual machine that reflects the application affinity rule between the first application and the second application and that indicates that the first virtual machine and the second virtual machine should run on the same hypervisor within the plurality of hypervisors.

In some embodiments, the second application may also be configured to run on a third virtual machine that may be configured to run on one of the plurality of hypervisors. In at least one embodiment, the method for managing affinity rules in virtual-machine environments may further include detecting that the second application has moved from the second virtual machine to the third virtual machine and in response to detecting that the second application has moved from the second virtual machine to the third virtual machine, deleting the virtual-machine affinity rule between the first virtual machine and the second virtual machine and/or creating a virtual-machine affinity rule between the first virtual machine and the third virtual machine that reflects the application affinity rule between the first application and the second application and that indicates whether the first virtual machine and the second virtual machine should run on the same hypervisor within the plurality of hypervisors.

In certain embodiments, the first virtual machine, the second virtual machine, and/or the third virtual machine may represent at least a portion of a cluster of virtual machines configured to run the first application and/or the second application.

In other embodiments, the step of selecting the hypervisor from among the plurality of hypervisors on which to run the second application may include (1) determining that the first application is running on the hypervisor, (2) determining that the application affinity rule between the first application and the second application indicates that the first application and the second application should run on the same hypervisor within the plurality of hypervisors, and (3) causing the second application to run on the hypervisor based at least in part on determining that the first application is running on the hypervisor and the application affinity rule between the first application and the second application.

In one embodiment, the step of determining that the first application is running on the hypervisor may include determining that the first application is running on the first virtual machine and determining that the first virtual machine is running on the hypervisor, and the step of causing the second application to run on the hypervisor may include determining that the second virtual machine is running on the hypervisor and causing the second application to run on the second virtual machine based at least in part on determining that the second virtual machine is running on the hypervisor.

In at least one embodiment, the step of causing the second application to run on the hypervisor may include (1) determining that there is no virtual machine running on the hypervisor on which to run the second application, (2) causing the second application to run on the second virtual machine that is running on an additional hypervisor from among the plurality of hypervisors based at least in part on determining that there is no virtual machine running on the hypervisor on which to run the second application, and (3) creating a virtual-machine affinity rule between the first virtual machine and the second virtual machine that reflects the application affinity rule between the first application and the second application and that indicates that the first virtual machine and the second virtual machine should run on the same hypervisor within the plurality of hypervisors.

In certain embodiments, the second application may be configured to run within a cluster environment. In at least one embodiment, the step of identifying the application affinity rule between the first application and the second application may include (1) receiving a request that indicates that the first application and the second application should run on the same hypervisor within the plurality of hypervisors and (2) in response to the request, creating the application affinity rule between the first application and the second application that indicates that the first application and the second application should run on the same hypervisor within the plurality of hypervisors.

In one embodiment, a system for implementing the above-described method may include (1) an application-identifying module programmed to identify a first application configured to run on a first virtual machine and a second application configured to run on a second virtual machine, (2) a rule-identifying module programmed to identify an application affinity rule between the first application and the second application that indicates whether the first application and the second application should run on a same hypervisor within a plurality of hypervisors, (3) a selecting module programmed to select a hypervisor from among the plurality of hypervisors on which to run the second application that satisfies the application affinity rule between the first application and the second application based at least in part on which hypervisor among the plurality of hypervisors is running the first application, and (4) at least one processor configured to execute the application-identifying module, the rule-identifying module, and the selecting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a first application configured to run on a first virtual machine that may be configured to run on one of a plurality of hypervisors, (2) identify a second application configured to run on a second virtual machine that may be configured to run on one of the plurality of hypervisors, (3) identify an application affinity rule between the first application and the second application that indicates whether the first application and the second application should run on a same hypervisor within the plurality of hypervisors, and (4) select a hypervisor from among the plurality of hypervisors on which to run the second application that satisfies the application affinity rule between the first application and the second application based at least in part on which hypervisor among the plurality of hypervisors is running the first application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of an exemplary virtual-machine environment.

FIG. 5 is a block diagram of an exemplary virtual-machine environment.

FIG. 7 is a block diagram of an exemplary virtual-machine environment.

FIG. 8 is a block diagram of an exemplary virtual-machine environment.

FIG. 9 is a block diagram of an exemplary virtual-machine environment.

Figure 1:
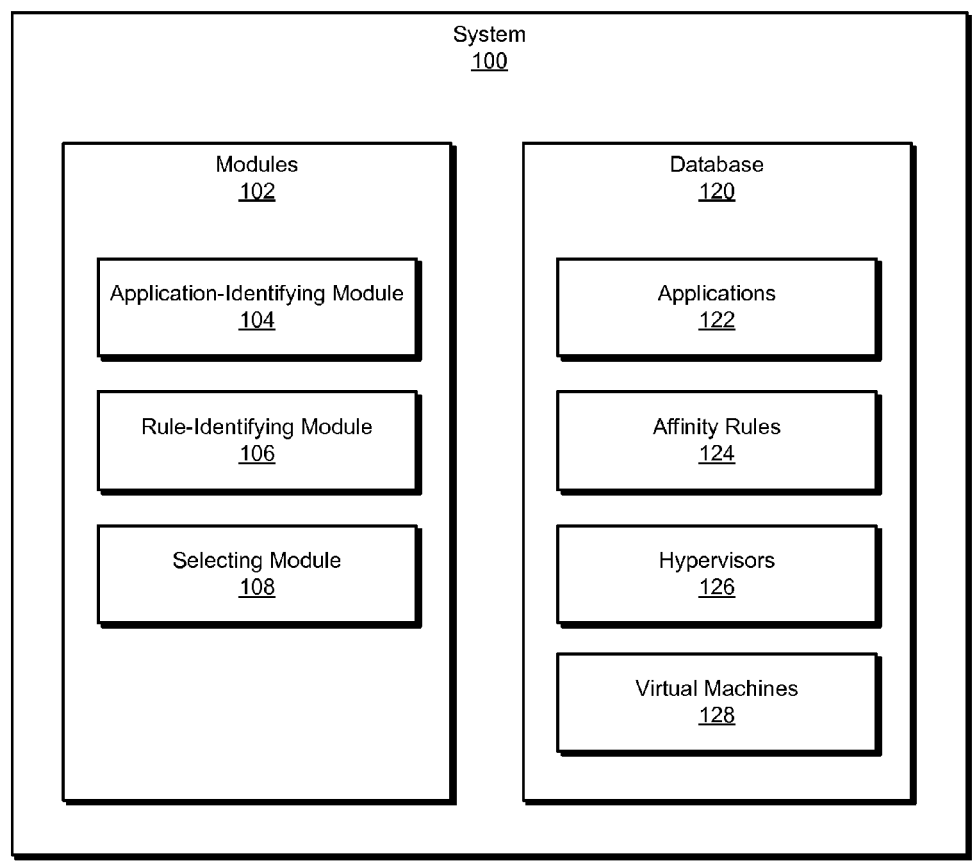
FIG. 1 is a block diagram of an exemplary system for managing affinity rules in virtual-machine environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing affinity rules in virtual-machine environments. As will be explained in greater detail below, by dynamically configuring virtual-machine affinity rules that are associated with virtual machines based on application affinity rules associated with applications running within the virtual machines, the systems and methods described herein may enable the enforcement of application affinity rules within a virtual-machine environment in which applications may move among virtual machines. Furthermore, in some examples, by enabling the enforcement of application affinity rules within a virtual-machine environment in which applications may move among virtual machines, these systems and methods may enable the use of application affinity rules to manage applications running within clusters of virtual machines.

Figure 2:
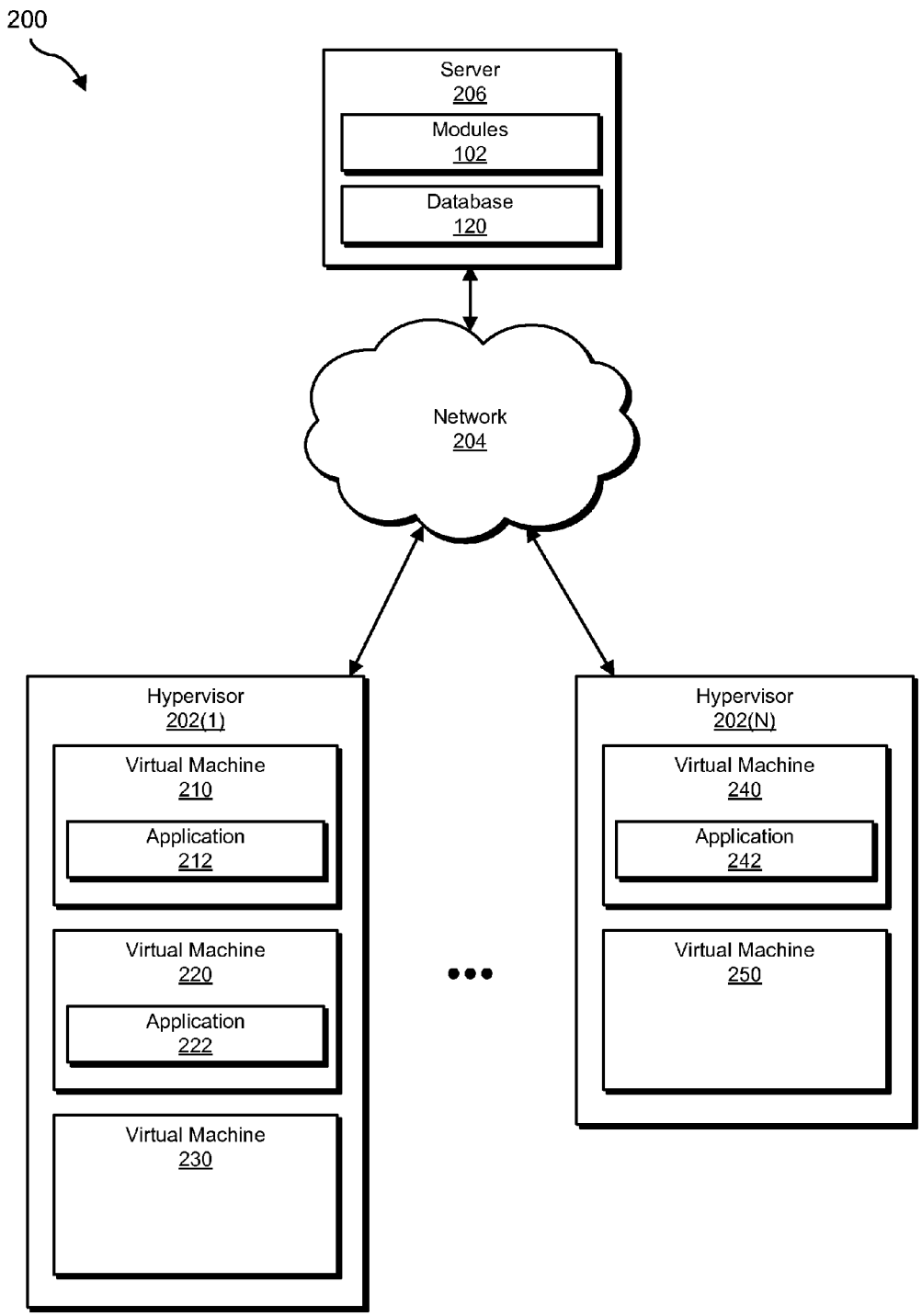
FIG. 2 is a block diagram of an exemplary system for managing affinity rules in virtual-machine environments.

The following will provide, with reference to FIGS. 1-2, detailed descriptions of exemplary systems for managing affinity rules in virtual-machine environments. Detailed descriptions of corresponding computer-implemented methods will also be provided in connection with FIGS. 3-14. In addition, detailed descriptions of an exemplary computing system and network architecture capable of implementing one or more of the embodiments described herein will be provided in connection with FIGS. 15 and 16, respectively.

FIG. 1 is a block diagram of an exemplary system 100 for managing affinity rules in virtual-machine environments. As illustrated in this figure, exemplary system 100 may include one or more modules 102 for performing one or more tasks. For example, and as will be explained in greater detail below, exemplary system 100 may include an application-identifying module 104 programmed to identify a first application configured to run on a first virtual machine that may be configured to run on one of a plurality of hypervisors and a second application configured to run on a second virtual machine that may be configured to run on one of the plurality of hypervisors. Exemplary system 100 may also include a rule-identifying module 106 programmed to identify an application affinity rule between the first application and the second application that indicates whether the first application and the second application should run on the same hypervisor within the plurality of hypervisors.

In addition, and as will be described in greater detail below, exemplary system 100 may include a selecting module 108 programmed to select a hypervisor from among the plurality of hypervisors on which to run the second application that satisfies the application affinity rule between the first application and the second application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., virtual machines 210, 220, 230, 240, and 250, hypervisors 202(1)-(N), and/or server 206), computing system 1510 in FIG. 15, and/or portions of exemplary network architecture 1600 in FIG. 16. One or more of modules 102 in FIG. 1 may also represent all or portions of one or more special-purpose computers configured to perform one or more tasks. In at least one example, one or more of modules 102 in FIG. 1 may represent a portion of an application-cluster management system and/or a virtual-machine environment management system.

As illustrated in FIG. 1, exemplary system 100 may also include one or more databases, such as database 120. In one example, database 120 may include applications 122 for storing information about one or more applications, affinity rules 124 for storing information about one or more affinity rules (e.g., application affinity rules and/or virtual-machine affinity rules), hypervisors 126 for storing information about one or more hypervisors, and virtual machines 128 for storing information about one or more virtual machines.

Database 120 may represent portions of a single database or computing device or a plurality of databases or computing devices. For example, database 120 may represent a portion of virtual machines 210, 220, 230, 240, and 250, hypervisors 202(1)-(N), and/or server 206 in FIG. 2, computing system 1510 in FIG. 15, and/or portions of exemplary network architecture 1600 in FIG. 16. Alternatively, database 120 in FIG. 1 may represent one or more physically separate devices capable of being accessed by a computing device, such as virtual machines 210, 220, 230, 240, and 250, hypervisors 202(1)-(N), and/or server 206 in FIG. 2, computing system 1510 in FIG. 15, and/or portions of exemplary network architecture 1600 in FIG. 16.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of virtual machines (e.g., virtual machines 210, 220, 230, 240, and 250), a plurality of hypervisors (e.g., hypervisors 202(1)-(N)), and a server 206 capable of communicating via a network 204. Server 206 may be programmed with one or more of modules 102 and/or may store all or a portion of the data in database 120. Additionally or alternatively, one or more of virtual machines 210, 220, 230, 240, and 250 and/or one or more of hypervisors 202(1)-(N) may be programmed with one or more of modules 102 and/or may store all or a portion of the data in database 120.

In one embodiment, one or more of modules 102 from FIG. 1 may, when executed by at least one processor of hypervisors 202(1)-(N) and/or server 206, facilitate virtual machines 210, 220, 230, 240, and 250, hypervisors 202(1)-(N), and/or server 206 in managing affinity rules in virtual-machine environments. For example, and as will be described in greater detail below, one or more of modules 102 may cause virtual machines 210, 220, 230, 240, and 250, hypervisors 202(1)-(N), and/or server 206 to (1) identify a first application (e.g., application 212) configured to run on a first virtual machine (e.g., one or more of virtual machines 210, 220, 230, 240, and 250) that may be configured to run on one of a plurality of hypervisors (e.g., one or more of hypervisor 202(1)-(N)), (2) identify a second application (e.g., application 222) configured to run on a second virtual machine (e.g., one or more of virtual machines 210, 220, 230, 240, and 250) that may be configured to run on one of the plurality of hypervisors, (3) identify an application affinity rule between the first application and the second application that indicates whether the first application and the second application should run on a same hypervisor within the plurality of hypervisors (e.g., an application affinity rule within affinity rules 124 that indicates that application 212 and application 222 should run on the same hypervisor), and (4) select a hypervisor (e.g., hypervisor 201(1)) from among the plurality of hypervisors on which to run the second application that satisfies the application affinity rule between the first application and the second application based at least in part on which hypervisor among the plurality of hypervisors is running the first application (e.g., hypervisor 201(1)).

Hypervisors 202(1)-(N) generally represent any type or form of virtualization platform capable of running and/or managing multiple virtual machines on a single physical computing device. For example as shown in FIG. 2, hypervisors 202(1)-(N) may be configured to run and manage virtual machines 210, 220, 230, 240, and 250. In at least one example, hypervisors 202(1)-(N) may represent any type or form of computing device capable of running a hypervisor and/or a virtual machine.

Virtual machines 210, 220, 230, 240, and 250 generally represent any virtualization (including hardware-assisted virtualization), implementation, or emulation of a physical computing device. In one example, virtual machines 210, 220, 230, 240, and 250 may represent nodes of a cluster (e.g., a VERITAS CLUSTER SERVER cluster) configured to run one or more applications. For example, virtual machines 210, 220, 230, 240, and 250 may each be configured to run applications 212, 222, and 242.

Applications 212, 222, and 242 generally represent applications configured to run on virtual machines. In at least one example, applications 212, 222, and 242 may represent application configured to run within a cluster of virtual machines that includes virtual machines 210, 220, 230, 240, and 250. In the examples that follow, applications 212 and 222 may represent applications that are associated with an application affinity rule that indicates that applications 212 and 222 should run on the same hypervisor, and applications 212 and 242 may represent applications that are associated with an application anti-affinity rule that indicates that applications 212 and 242 should run on separate hypervisors.

Server 206 generally represents any type or form of computing device that is capable of reading computer-executable instructions. Examples of server 206 include, without limitation, application servers and database servers configured to provide various database services and/or run certain software applications. In one example, server 206 may represent at least a portion of and/or communicate with an application-cluster management system and/or a virtual-machine environment management system.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1600 in FIG. 16, or the like. Network 204 may facilitate communication or data transfer using wireless or wired connections. In one embodiment, network 204 may facilitate communication between virtual machines 210, 220, 230, 240, and 250, hypervisors 202(1)-(N), and/or server 206.

Figure 3:
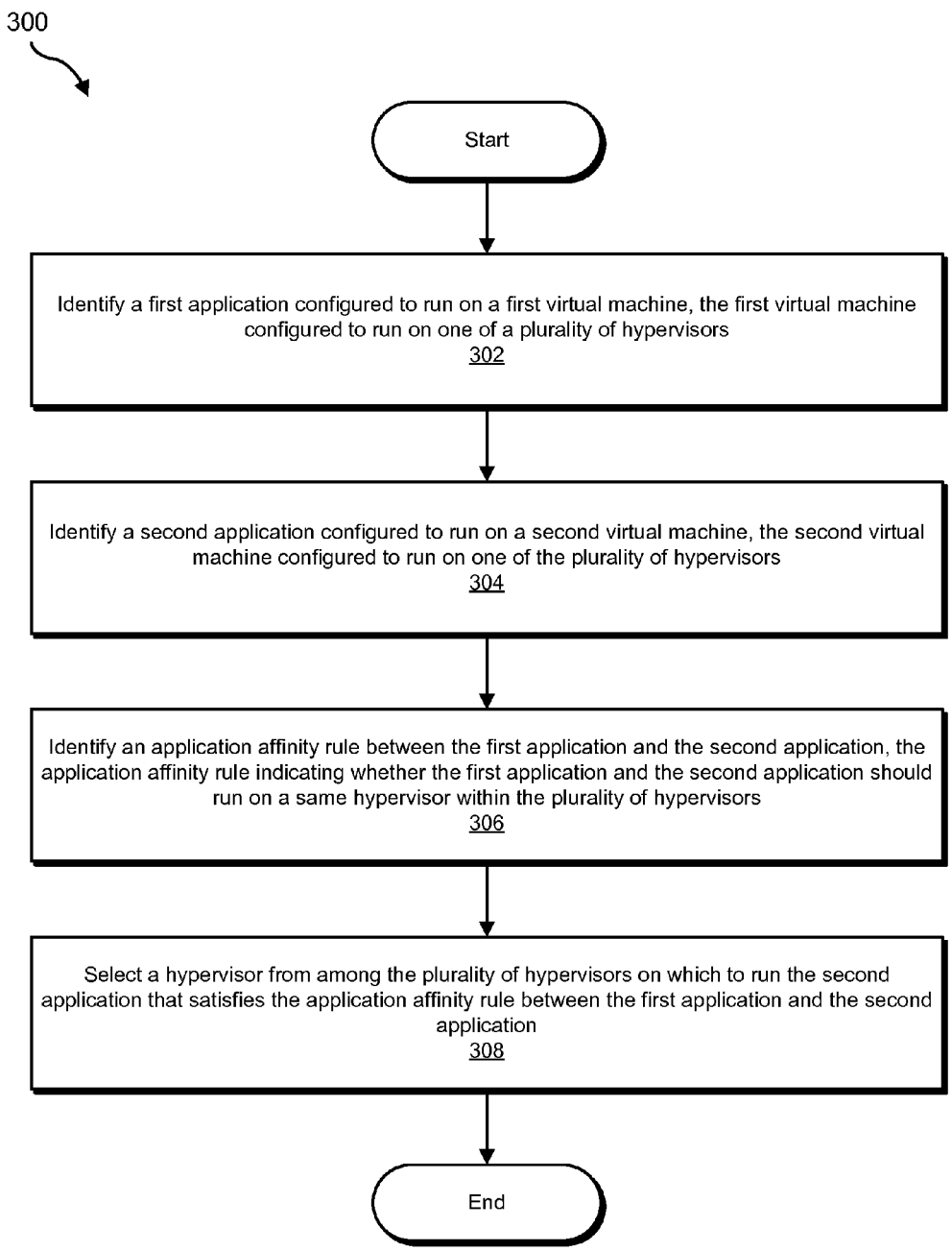
FIG. 3 is a flow diagram of an exemplary method for managing affinity rules in virtual-machine environments.

FIG. 3 is a flow diagram of an exemplary computer-implemented method 300 for managing affinity rules in virtual-machine environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1510 in FIG. 15, and/or portions of exemplary network architecture 1600 in FIG. 16.

As illustrated in FIG. 3, at step 302 one or more of the systems described herein may identify a first application configured to run on a first virtual machine, the first virtual machine configured to run on one of a plurality of hypervisors. For example, at step 302 application-identifying module 104 may, as part of server 206 in FIG. 2, identify application 212 configured to run on virtual machines 210, 220, 230, 240, and/or 250. At step 304, one or more of the systems described herein may identify a second application configured to run on a second virtual machine, the second virtual machine configured to run on one of the plurality of hypervisors. For example, at step 304 application-identifying module 104 may, as part of server 206 in FIG. 2, identify application 222 or application 242 configured to run on virtual machines 210, 220, 230, 240, and/or 250.

The systems described herein may perform steps 302 and 304 in any suitable manner. For example, application-identifying module 104 may query applications 122 to identify the first application and the second application. Additionally and/or alternatively, application-identifying module 104 may read a configuration file identifying the first application and the second application. In at least one example, application-identifying module 104 may represent a portion of an application-cluster management system and may identify the first application and the second application by identifying applications configured to run within an application cluster.

In other examples, application-identifying module 104 may identify the first application and the second application by identifying an application affinity rule associated with the first application and the second application. For example, application-identifying module 104 may identify the first and second applications by receiving (e.g., via a graphical user interface or a command line interface) a request to create an application affinity rule between the first and second applications.

As used herein, the term "application" may refer to any software or program configured to run on a virtual machine. The term "application" may also refer to any resources required by applications (e.g., files, file systems, IP addresses, and/or other applications) and/or individual application instances or processes. Examples of applications include, without limitation, web applications, database applications, file applications, email applications, messaging applications, and/or any associated resources. In one example, one or more applications may be configured to run within a cluster of virtual machines.

The term "cluster", as used herein, may generally refer to two or more computing nodes on which an application may run. For example, a cluster may include two or more virtual machines configured to run one or more applications. A cluster may be used to provide application high availability and/or disaster recovery by enabling applications running within the cluster to fail over and/or switch over from one node in the cluster to another node within the cluster. For example if an application within the cluster fails (e.g., because of a hardware failure, an operating system failure, a failure of the application itself), the failed application may be restarted on another node within the cluster. Using FIG. 2 as an example, virtual machines 210, 220, 230, 240, and 250 may represent nodes of an application cluster configured to run applications 212, 222, and 242. In the event that application 212 fails (e.g., because of a failure of hypervisor 202(1), a failure of virtual machine 210, or a failure of application 212 itself), application 212 may be restarted on one of virtual machines 210, 220, 230, 240, and 250. In addition to recovering failed application, a cluster may move applications within the cluster as a way to balance resource utilization across all nodes within the cluster. Examples of clusters include, without limitation, VERITAS CLUSTER SERVER clusters and/or MICROSOFT CLUSTER SERVER clusters.

The term "virtual machine", as used herein, may generally refer to any virtualization (including hardware-assisted virtualization), implementation, or emulation of a physical computing device managed by a hypervisor that may be capable of running one or more applications and that may be associated with an affinity rule. In at least one example, two or more virtual machines may be configured as nodes of a cluster, wherein each node of the cluster may be capable of running each of a set of applications.

As used herein, the term "hypervisor" may refer to any type or form of virtualization platform capable of running and/or managing multiple virtual machines on a single physical computing device. Examples of hypervisors include, without limitation, VMWARE ESX/ESXI, MICROSOFT HYPER-V, ORACLE VM, SUN VIRTUALBOX, CITRIX XEN-SERVER, any bare-metal hypervisor, and/or any hosted hypervisor. In some examples, the term "hypervisor" may refer to software executing on a physical computing device that manages the execution of virtual machines on the physical computing device and/or the physical computing device itself.

Returning to FIG. 3 at step 306, one or more of the systems described herein may identify an application affinity rule between the first application and the second application, the application affinity rule indicating whether the first application and the second application should run on a same hypervisor within the plurality of hypervisors. For example, at step 306 rule-identifying module 106 may, as part of server 206 in FIG. 2, identify an application affinity rule between applications 212 and 222 that indicates that applications 212 and 222 should run on the same hypervisor. In another example, rule-identifying module 106 may, as part of server 206 in FIG. 2, identify an application anti-affinity rule between applications 212 and 242 that indicates that applications 212 and 242 should not run on the same hypervisor.

As used herein, the term "application affinity rule" may refer to any rule or policy that specifies an affinity relationship (e.g., an affinity or anti-affinity relationship) between two or more applications. In one example, an application affinity rule may indicate that two or more related application should run on the same hypervisor. For example, an application affinity rule between a web-server application and a related database application may indicate that the web-server application and the database application should run on the same hypervisor. In another example, an application affinity rule may indicate that two applications should run on separate hypervisors. For example, an application affinity rule between two instances of a database application may indicate that the two instances of the database application should run on separate hypervisors. Generally, the term "application affinity rule" may refer to any rule specifying whether or not two or more applications should run on and/or share the same physical computing resources (e.g., for performance reasons, for security reasons, for failure risk management, etc.).

The systems described herein may perform step 306 in any suitable manner. For example, rule-identifying module 106 may query affinity rules 124 to identify the application affinity rule between the first and second applications. Additionally and/or alternatively, rule-identifying module 106 may read a configuration file identifying the application affinity rule between the first and second applications. In at least one example, rule-identifying module 106 may represent a portion of an application-cluster management system and may identify the application affinity rule by identifying application affinity rules associated with applications configured to run within an application cluster.

Additionally and/or alternatively, rule-identifying module 106 may identify the application affinity rule between the first application and the second application by allowing an administrator to create an application affinity rule between the first application and the second application. For example, rule-identifying module 106 may create the application affinity rule between the first application and the second application in response to a request to create an affinity relationship between the first and second applications. For example, rule-identifying module 106 may enable an administrator create the application affinity rule between the first application and the second application (e.g., via a graphical user interface and/or a command line interface).

At step 308, one or more of the systems described herein may select, based at least in part on which hypervisor among the plurality of hypervisors is running the first application, a hypervisor from among the plurality of hypervisors on which to run the second application that satisfies the application affinity rule between the first application and the second application. For example, at step 308 selecting module 108 may, as part of server 206 in FIG. 2, select a hypervisor from among hypervisors 202(1)-(N) on which to run application 222 that satisfies the application affinity rule between application 212 and application 222 based at least in part on which hypervisor is running application 212.

The systems described herein may perform step 308 in a variety of contexts. In one example, selecting module 108 may represent a portion of an application-cluster management system that ensures that applications configured to run within a cluster of virtual machines are available. As part of the application-cluster management system, selecting module 108 may ensure that the applications are started, restarted, switched over, or failed over within the cluster of virtual machines according to application affinity rule associated with the applications. In another example, selecting module 108 may communicate with such an application-management system to ensure that the applications managed by the application-cluster management system are started, restarted, switched over, and/or failed over within a cluster of virtual machines according to application affinity rule associated with the applications.

Additionally and/or alternatively, selecting module 108 may represent a portion of a virtual-machine environment management system that manages a cluster of virtual machines on a plurality of hypervisors. As part of the virtual-machine environment management system, selecting module 108 may ensure that the virtual machines within the cluster are started, restarted, switched over, and/or failed over within the plurality of hypervisors according to application affinity rule associated with the applications running within the cluster of virtual machines. In another example, selecting module 108 may communicate with such a virtual-machine environment management system to ensure that the virtual machines within the cluster are started, restarted, switched over, and/or failed over within the plurality of hypervisors according to the application affinity rule associated with the applications running within the cluster of virtual machines.

The systems described herein may perform step 308 in any suitable manner. For example, selecting module 108 may select a hypervisor on which to run the second application that satisfies the application affinity rule between the second application and the first application by selecting a virtual machine on which to run the second application and/or by selecting a hypervisor from among the plurality of hypervisors on which to run the virtual machine that is running the second application based on which hypervisor is running the first application.

For example, selecting module 108 may select an appropriate hypervisor on which to run the virtual machine running the second application by monitoring the virtual machines that are configured to run the first and second applications, determining which of these virtual machines are running the first and second applications, and placing the virtual machine that is running the second application either on the same hypervisor that is running the virtual machine that is running the first application or on another hypervisor that is not running the virtual machine that is running the first application according to the application affinity rule between the first and second applications. Selecting module 108 may continually and/or periodically perform these steps to ensure that the application affinity rule between the first and second applications remains satisfied.

Additionally and/or alternatively, selecting module 108 may select an appropriate hypervisor on which to run the virtual machine running the second application by creating a virtual-machine affinity rule between the virtual machine running the second application and the virtual machine running the first application. As used herein, the term "virtual-machine affinity rule" may refer to any rule or policy that specifies an affinity relationship (e.g., an affinity or anti-affinity relationship) between two or more virtual machines. For example, a virtual-machine affinity rule may indicate that two or more virtual machines should run on the same hypervisor or that two or more virtual machine applications should run on separate hypervisors.

Selecting module 108 may create the virtual-machine affinity rule between the virtual machine running the second application and the virtual machine running the first application by monitoring the virtual machines that are configured to run the first and second applications and by determining which of these virtual machines are running the first and second applications. For example, selecting module 108 may monitor a cluster of virtual machines that are configured to run the first and second applications to determine which of the virtual machines are running the first and second applications and may update the virtual-machine affinity rules associated with the cluster of virtual machines based on which of the virtual machines are running the first and second applications. In at least one example, selecting module 108 may rely on a virtual-machine environment management system to enforce the virtual-machine affinity rules associated with the cluster of virtual machines.

Figure 6:
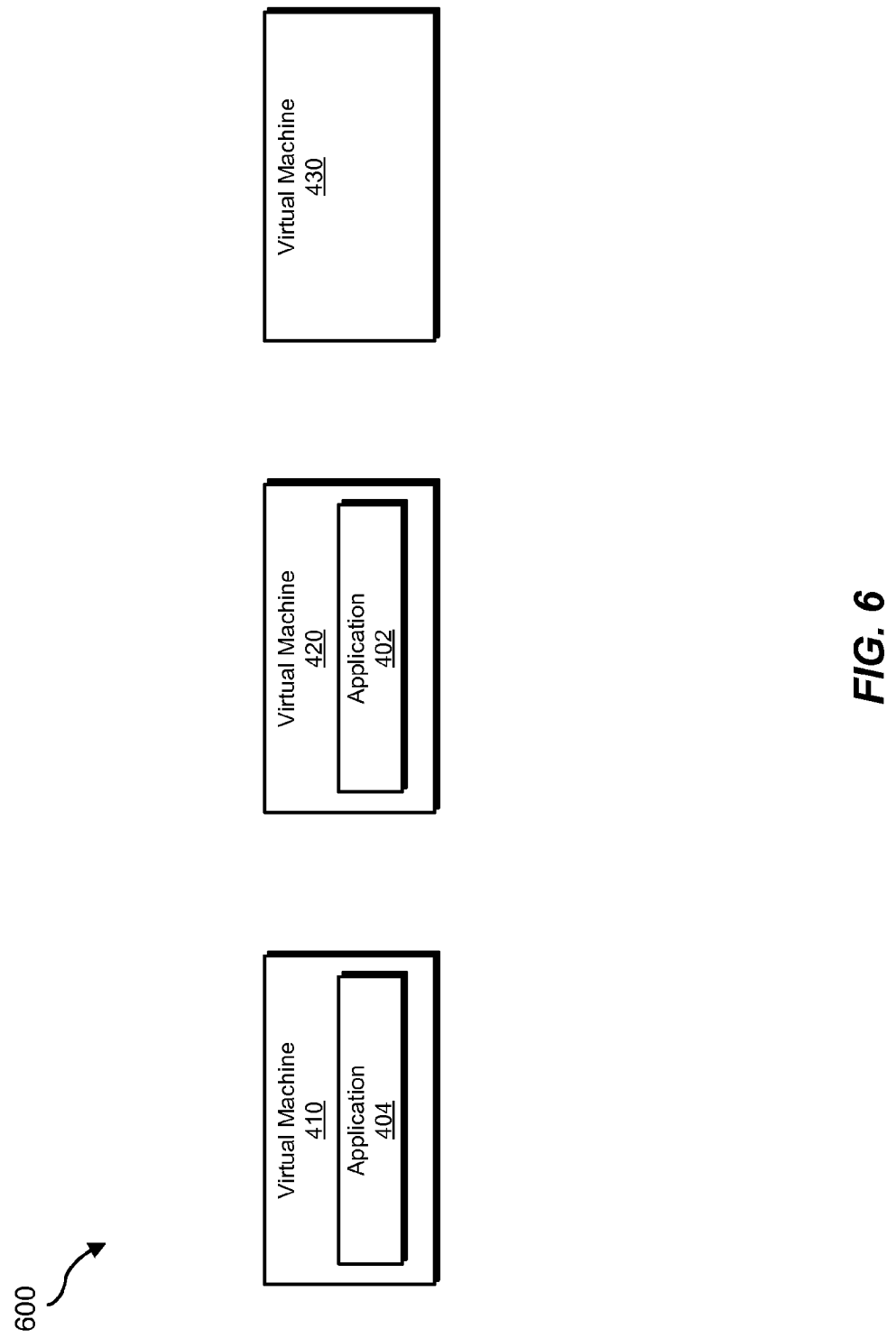
FIG. 6 is a block diagram of an exemplary virtual-machine environment.

FIGS. 4-6 illustrate how one or more of the systems described herein may dynamically update virtual-machine affinity rules associated with nodes of a virtual-machine based application cluster based on the status of applications managed by the application cluster. FIG. 4 illustrates an exemplary state 400 of the application cluster after two applications have begun running within the application cluster. FIG. 5 illustrates an exemplary state 500 of the same application cluster after one of the two applications has moved from one node of the application cluster to another. FIG. 6 illustrates an exemplary state 600 of the application cluster after the other of the two applications has moved from one node of the application cluster to another.

As illustrated in FIG. 4, the application cluster may include three nodes (e.g., virtual machines 410, 420, and 430), each of which may be configured to run applications 402 and 404. In this example, an administrator may have configured an application affinity rule (e.g., an affinity rule or an anti-affinity rule) between applications 402 and 404 and may have started application 402 on virtual machine 410 and application 404 on virtual machine 430.

Selecting module 108 may then ensure that applications 402 and 404 run on the same hypervisor or separate hypervisors according to the application affinity rule between applications 402 and 404 by ensuring that the virtual machines, on which applications 402 and 404 run, run on the same hypervisor or separate hypervisors. For example, selecting module 108 may ensure that virtual machines 410 and 430 run on the same hypervisor or separate hypervisors by configuring a virtual-machine affinity rule between virtual machine 410 and virtual machine 430 that satisfies the application affinity rule between applications 402 and 404.

To illustrate, if the administrator created an affinity rule between applications 402 and 404 that indicates that applications 402 and 404 should run on the same hypervisor then selecting module 108 may configure a virtual-machine affinity rule between virtual machine 410 and virtual machine 430 that indicates that virtual machine 410 and virtual machine 430 should run on the same hypervisor. Likewise, if the administrator created an anti-affinity rule between applications 402 and 404 that indicates that applications 402 and 404 should not run on the same hypervisor then selecting module 108 may configure a virtual-machine affinity rule between virtual machine 410 and virtual machine 430 that indicates that virtual machine 410 and virtual machine 430 should not run on the same hypervisor.

After starting on virtual machine 410, application 402 and/or application 404 may move to another virtual machine within the application cluster. For example as shown in FIG. 5, application 402 may fail over to virtual machine 420. In response to the movement of application 402 from virtual machine 410 to virtual machine 420, selecting module 108 may delete the virtual-machine affinity rule between virtual machine 410 and virtual machine 430 and may configure a virtual-machine affinity rule between virtual machine 420 and virtual machine 430 that satisfies the application affinity rule between applications 402 and 404.

Like application 402, application 404 may also move to another virtual machine within the application cluster after starting on virtual machine 430. For example as shown in FIG. 6 after 402 has moved to virtual machine 420, application 404 may move to virtual machine 410. In response to the movement of application 404 from virtual machine 430 to virtual machine 410, selecting module 108 may delete the virtual-machine affinity rule between virtual machine 420 and virtual machine 430 and configure a similar virtual-machine affinity rule between virtual machine 410 and virtual machine 420 that satisfies the application affinity rule between applications 402 and 404.

Returning to FIG. 3, in addition to and/or as an alternative to selecting a hypervisor on which to run the virtual machine running the second application based on which hypervisor is running the first application, selecting module 108 may select a virtual machine from a plurality of available virtual machines on which to run the second application based on which hypervisor is running the first application. For example, selecting module 108 may select a virtual machine on which to run the second application in order to move (e.g., switch over or fail over) the second application to the virtual machine.

FIGS. 7-8 illustrate how one or more of the systems described herein may ensure that application affinity rules remain satisfied when applications move within an application cluster. FIG. 7 illustrates an exemplary state 700 of the application cluster after two applications have begun running within the application cluster. FIG. 8 illustrates an exemplary state 800 of the same application cluster after one of the two applications has been moved from one node of the application cluster to another.

As shown in FIG. 7, the application cluster may include five nodes (e.g., virtual machines 710, 712, 714, 716, and 718) running on two hypervisors (e.g., hypervisors 720 and 730), each node configured to run applications 702 and 704. In one example, an administrator may have configured an application affinity rule between applications 702 and 704 indicating that applications 702 and 704 should run on the same hypervisor. If the administrator starts application 702 on virtual machine 710 and application 704 on virtual machine 712, selecting module 108 may configure a virtual-machine affinity rule between virtual machine 710 and virtual machine 712 that indicates that virtual machine 710 and virtual machine 712 should run on the same hypervisor. As a result of the virtual-machine affinity rule between virtual machines 710 and 712, virtual machines 710 and 712 may be placed on hypervisor 720.

If application 704 later fails (e.g., as a result of a failure of virtual machine 712), selecting module 108 may determine whether to failover application 704 to one of the other virtual machines in the application cluster that are capable of running application 704 (e.g., virtual machine 714, virtual machine 716, or virtual machine 720) based on the application affinity rule between application 702 and 704. In this example because virtual machine 714 is running on hypervisor 720 (which is the same hypervisor running application 702) and because virtual machines 716 and 718 are running on hypervisor 730 (which is not the same hypervisor running application 702), selecting module 108 may determine that virtual machine 714 is the only virtual machine within the application cluster on which application 704 may run that satisfies the application affinity rule between application 702 and 704. As a result, selecting module 108 may cause application 704 to failover to virtual machine 714 instead of to virtual machine 716 or virtual machine 718 (e.g., as illustrated in FIG. 8). Selecting module 108 may then delete the virtual-machine affinity rule between virtual machine 710 and virtual machine 712 and configure a virtual-machine affinity rule between virtual machine 710 and virtual machine 714 that satisfies the application affinity rule between applications 702 and 704.

Figure 10:
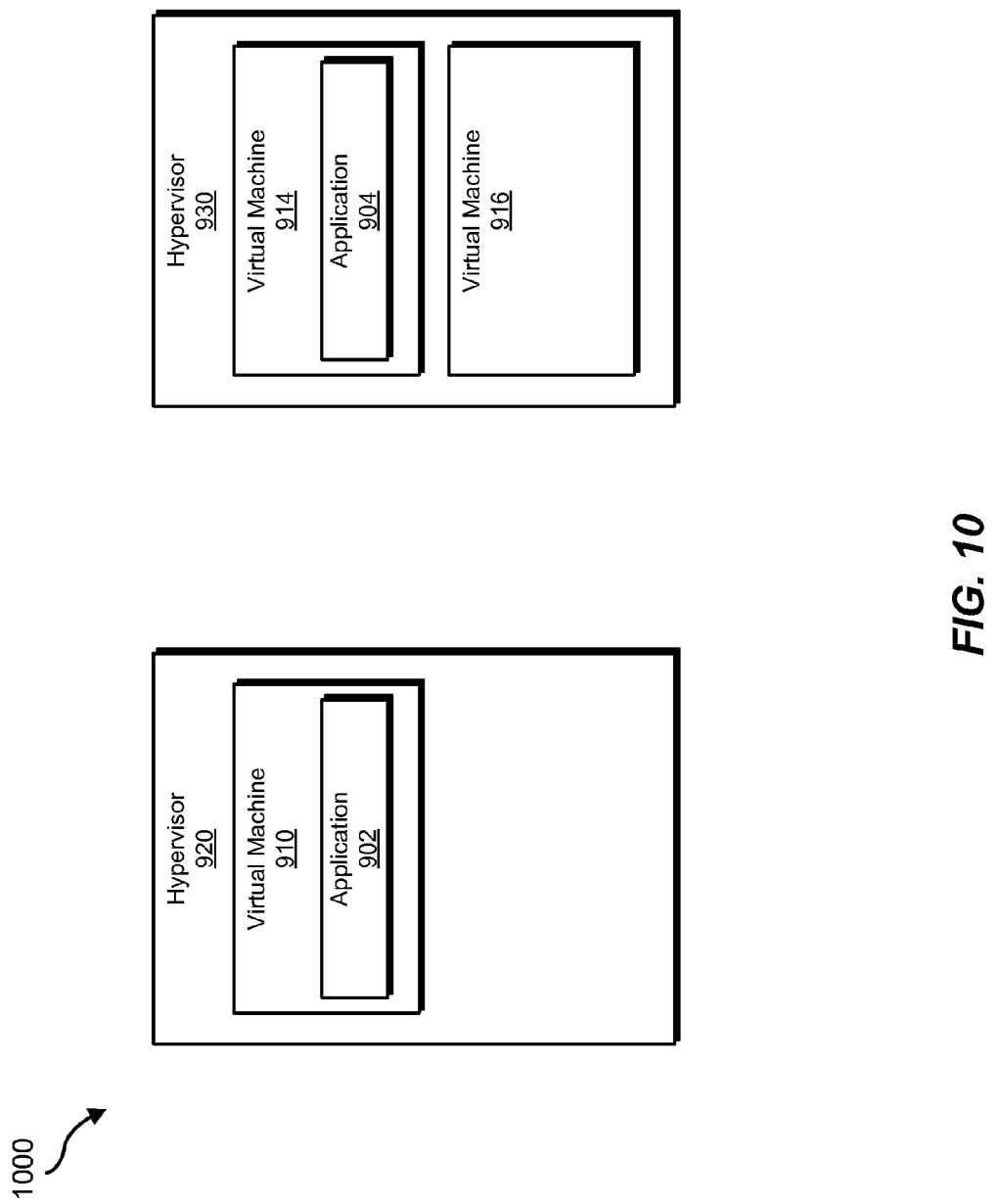
FIG. 10 is a block diagram of an exemplary virtual-machine environment.
Figure 11:
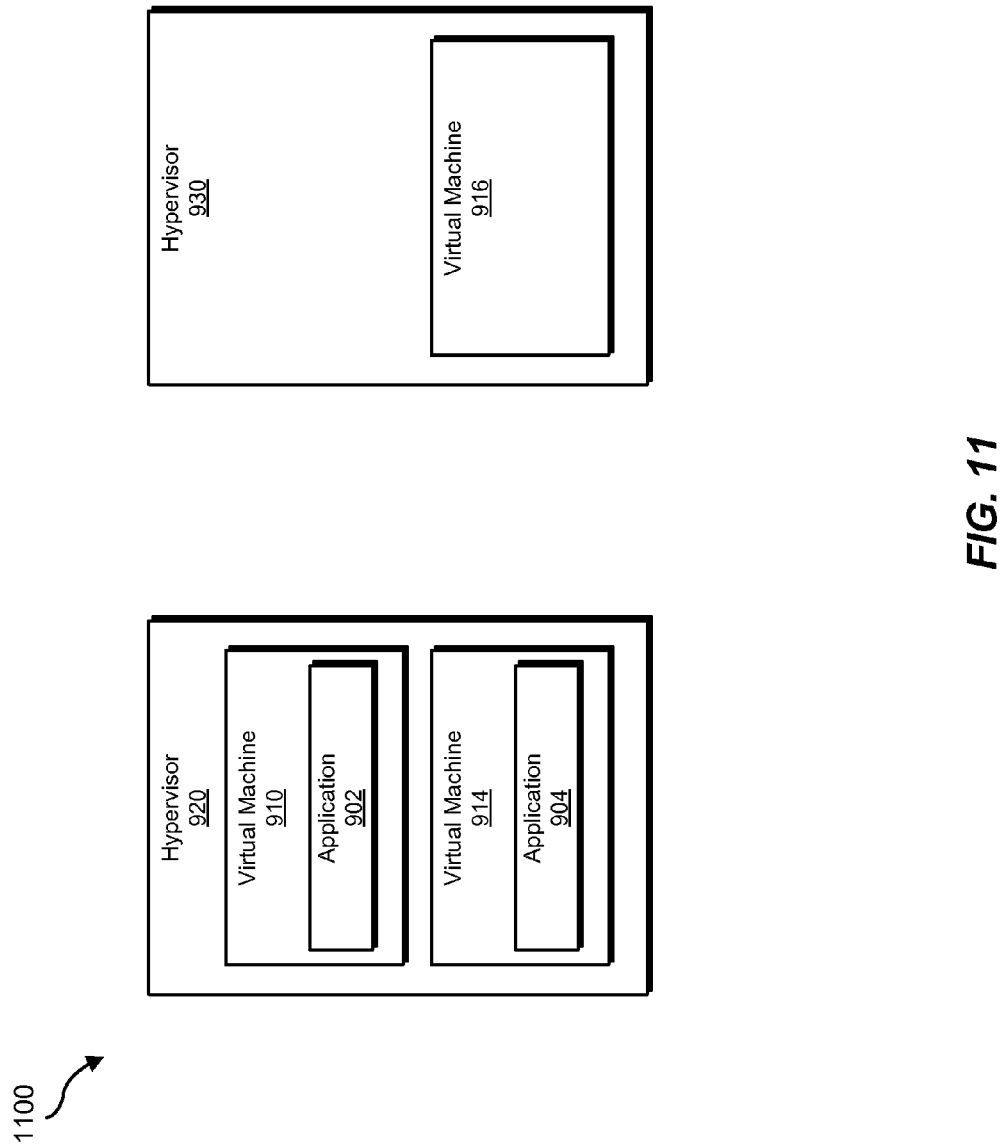
FIG. 11 is a block diagram of an exemplary virtual-machine environment.
Figure 12:
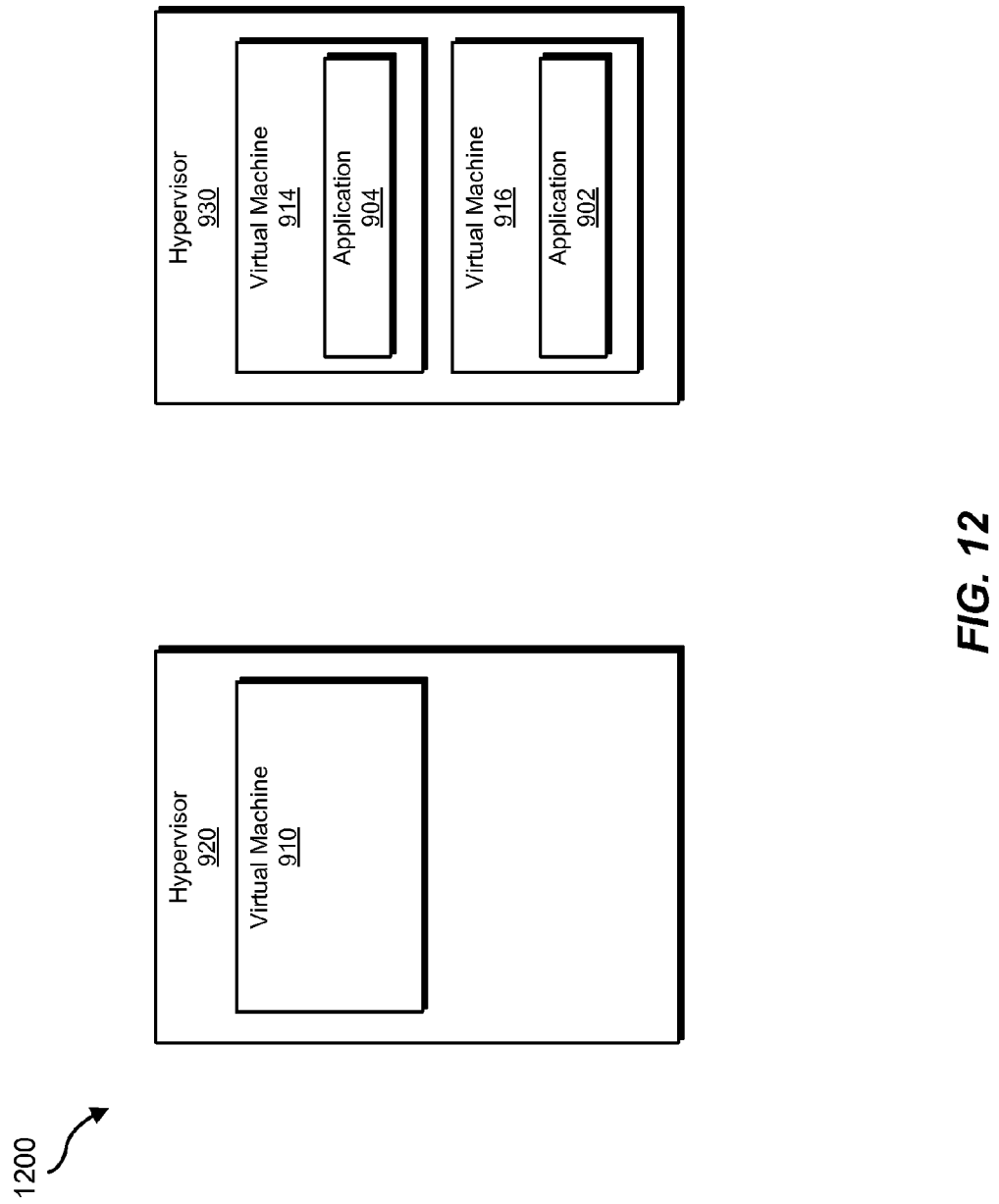
FIG. 12 is a block diagram of an exemplary virtual-machine environment.

FIGS. 9-12 also illustrate how one or more of the systems described herein may ensure that application affinity rules remain satisfied when applications move within an application cluster. FIG. 9 illustrates an exemplary state 900 of the application cluster after two applications have begun running within the application cluster. FIG. 10 illustrates an exemplary state 1000 of the same application cluster after one of the two applications has been failed over from one node of the application cluster to another. FIG. 11 illustrates an exemplary state 1100 of the same application cluster after the node to which the application was failed over has been place on the appropriate hypervisor. FIG. 12 illustrates an exemplary state 1200 of the same application cluster after one of the two applications has been switched over from one node of the application cluster to another.

As shown in FIG. 9, the application cluster may include four nodes (e.g., virtual machines 910, 912, 914, and 916) running on two hypervisor (e.g., hypervisors 920 and 930), each node being configured to run applications 902 and 904. In one example, an administrator may have configured an application affinity rule between applications 902 and 904 indicating that applications 902 and 904 should run within the same hypervisor. If the administrator starts application 902 on virtual machine 910 and application 904 on virtual machine 912, selecting module 108 may configure a virtual-machine affinity rule between virtual machine 910 and virtual machine 912 that indicates that virtual machine 910 and virtual machine 912 should run on the same hypervisor. As a result of the virtual-machine affinity rule between virtual machines 910 and 912, virtual machines 910 and 912 may be placed on hypervisor 920.

If application 904 then fails, selecting module 108 may determine whether to failover application 904 to one of the other virtual machines in the application cluster that are capable of running application 904 (e.g., virtual machine 914 or virtual machine 916) based on the application affinity rule between application 902 and 904. In this example, selecting module 108 may determine that virtual machines 914 and 916 are running on hypervisor 930 (which is not the same hypervisor running application 902) and that no virtual machine is running on hypervisor 920. As a result, selecting module 108 may fail over application 904 to virtual machine 914 (as illustrated in FIG. 10). Selecting module 108 may delete the virtual-machine affinity rule between virtual machine 910 and virtual machine 912 and configure a virtual-machine affinity rule between virtual machine 910 and virtual machine 914 that satisfies the application affinity rule between applications 902 and 904. As a result of the virtual-machine affinity rule between virtual machines 910 and 914, virtual machine 914 may be moved from hypervisor 930 to hypervisor 920 so as to once again satisfy the application affinity rule between applications 902 and 904 (e.g., as illustrated in FIG. 11).

Alternatively, after failing over application 904 to virtual machine 914 (e.g., as illustrated by FIG. 10), selecting module 108 may determine that the application affinity rule between applications 902 and 904 may be satisfied by moving application 902 from virtual machine 910 to virtual machine 916. As a result of this determination, selecting module 108 may switch over application 902 from virtual machine 910 to virtual machine 916 (e.g., as illustrated in FIG. 12). Selecting module 108 may then delete the virtual-machine affinity rule between virtual machine 910 and virtual machine 912 and configure a virtual-machine affinity rule between virtual machine 914 and virtual machine 916 that satisfies the application affinity rule between applications 902 and 904.

Figure 13:
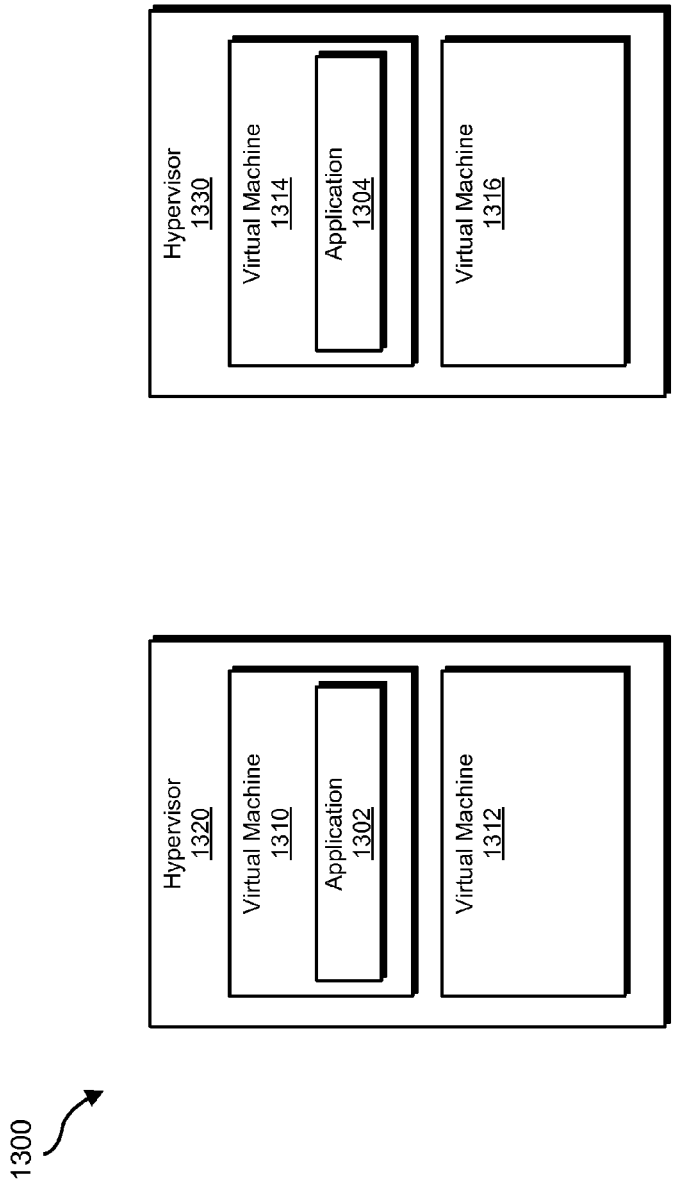
FIG. 13 is a block diagram of an exemplary virtual-machine environment.
Figure 14:
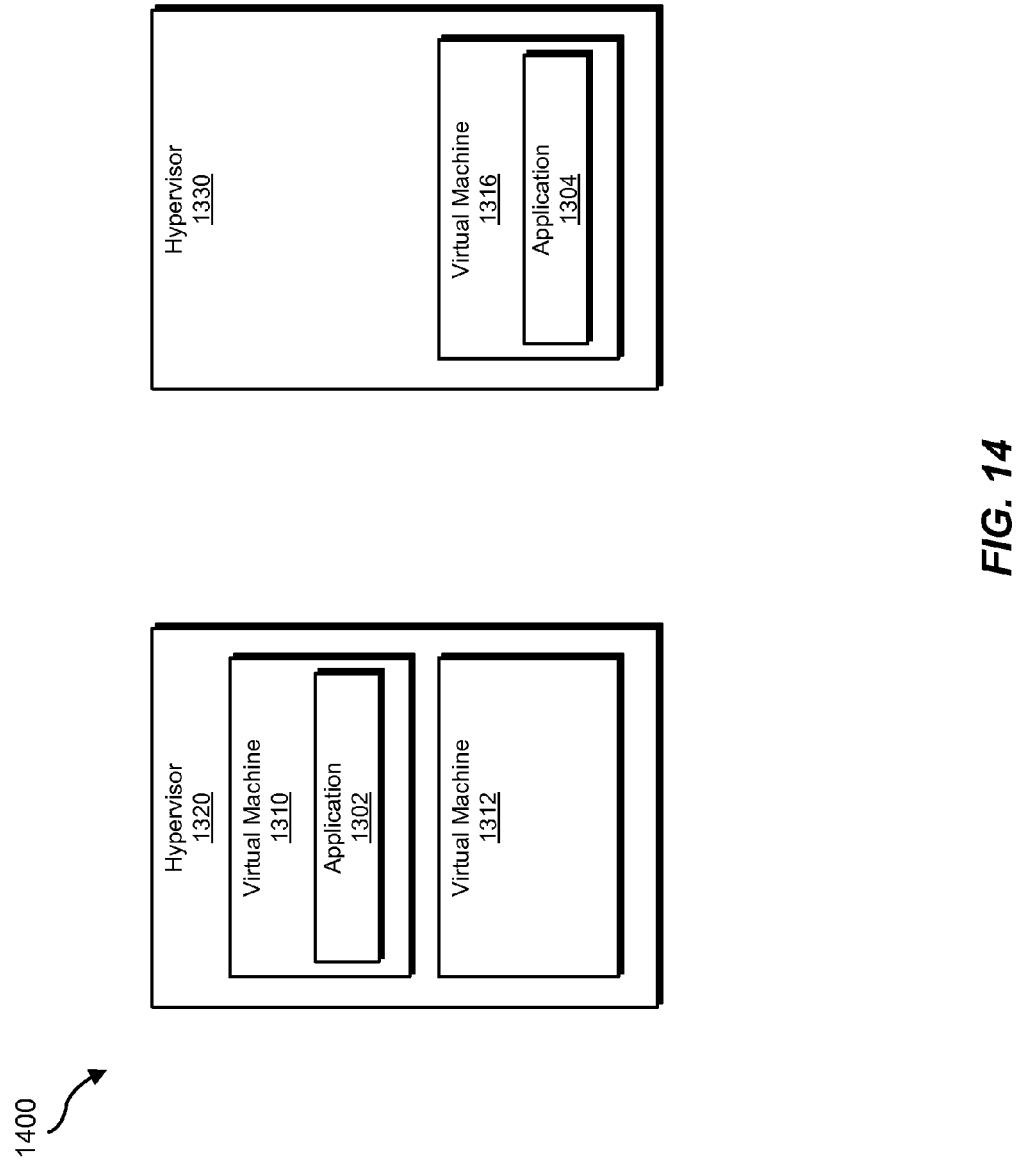
FIG. 14 is a block diagram of an exemplary virtual-machine environment.

FIGS. 13-14 illustrate how one or more of the systems described herein may ensure that application anti-affinity rules remain satisfied when applications move within an application cluster. FIG. 13 illustrates an exemplary state 1300 of the application cluster after two applications have begun running within the application cluster. FIG. 14 illustrates an exemplary state 1400 of the same application cluster after one of the two applications has been failed over from one node of the application cluster to another.

As shown in FIG. 13, the application cluster may include four nodes (e.g., virtual machines 1310, 1312, 1314, and 1316) running on two hypervisors (e.g., hypervisors 1320 and 1330), each node being configured to run applications 1302 and 1304. In one example, an administrator may have configured an application affinity rule between applications 1302 and 1304 indicating that applications 1302 and 1304 should not run within the same hypervisor. If the administrator starts application 1302 on virtual machine 1310 and application 1304 on virtual machine 1314, selecting module 108 may configure a virtual-machine affinity rule between virtual machine 1310 and virtual machine 1314 that indicates that virtual machine 1310 and virtual machine 1314 should not run on the same hypervisor. As a result of the virtual-machine affinity rule between virtual machines 1310 and 1314, virtual machines 1310 may be placed on hypervisor 1320, and virtual machine 1314 may be placed on hypervisor 1330.

If application 1304 then fails, selecting module 108 may determine whether to failover application 1304 to one of the other virtual machines in the application cluster that are capable of running application 1304 (e.g., virtual machine 1312 or virtual machine 1316) based on the application affinity rule between application 1302 and 1304. In this example, selecting module 108 may determine that virtual machine 1314 is running on hypervisor 1320 (which is the same hypervisor that is running application 1302) and that virtual machine 1316 is running on hypervisor 1330 (which is not the same hypervisor that is running application 1302). As a result, selecting module 108 may cause application 1304 to failover to virtual machine 1316 instead of to virtual machine 1314 in accordance with the application affinity rule between applications 1302 and 1304 (as illustrated in FIG. 14). Selecting module 108 may then delete the virtual-machine affinity rule between virtual machine 1310 and virtual machine 1314 and configure a virtual-machine affinity rule between virtual machine 1310 and virtual machine 1316 that satisfies the application affinity rule between applications 1302 and 1304.

Returning to FIG. 3 upon completion of step 308, exemplary method 300 in FIG. 3 may terminate.

As explained above, by dynamically configuring virtual-machine affinity rules that are associated with virtual machines based on application affinity rules associated with applications running within the virtual machines, the systems and methods described herein may enable the enforcement of application affinity rules within a virtual-machine environment in which applications may move among virtual machines. Furthermore, in some examples, by enabling the enforcement of application affinity rules within a virtual-machine environment in which applications may move among virtual machines, these systems and methods may enable the use of application affinity rules to manage applications running within clusters of virtual machines.

For example, the systems described herein may enable the use of application affinity rules to manage applications running within a cluster of virtual machines by (1) identifying the applications that are configured to run within the cluster of virtual machines, (2) identifying application affinity rules associated with the applications, and (3) ensuring that the applications are started, restarted, switched over, or failed over within the cluster of virtual machines according to the application affinity rule associated with the applications and/or ensuring that the virtual machines within the cluster are started, restarted, switched over, and/or failed over across a plurality of hypervisors according to the application affinity rule associated with the applications running within the cluster of virtual machines.

Figure 15:
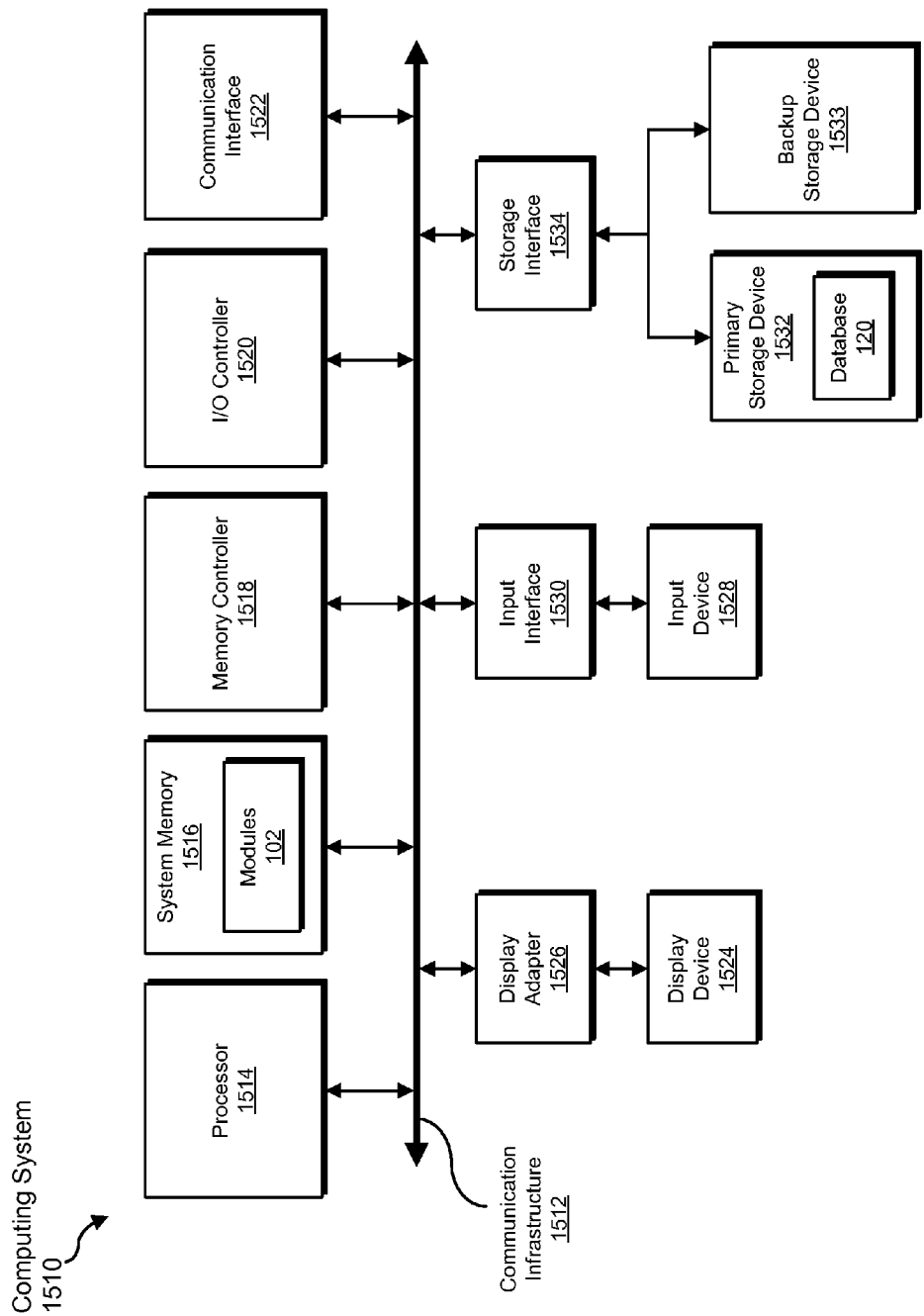
FIG. 15 is a block diagram of an exemplary computing system capable of implementing one or more of the embodiments described and/or illustrated herein.

FIG. 15 is a block diagram of an exemplary computing system 1510 capable of implementing one or more of the embodiments described and/or illustrated herein. For example, all or a portion of computing system 1510 may perform and/or be a means for performing, either alone or in combination with other elements, one or more of the identifying, selecting, creating, detecting, performing, deleting, determining, causing, moving, and receiving steps described herein. All or a portion of computing system 1510 may also perform and/or be a means for performing any other steps, methods, or processes described and/or illustrated herein.

Computing system 1510 broadly represents any single or multi-processor computing device or system capable of executing computer-readable instructions. Examples of computing system 1510 include, without limitation, workstations, laptops, client-side terminals, servers, distributed computing systems, handheld devices, or any other computing system or device. In its most basic configuration, computing system 1510 may include at least one processor 1514 and a system memory 1516.

Processor 1514 generally represents any type or form of processing unit capable of processing data or interpreting and executing instructions. In certain embodiments, processor 1514 may receive instructions from a software application or module. These instructions may cause processor 1514 to perform the functions of one or more of the exemplary embodiments described and/or illustrated herein.

System memory 1516 generally represents any type or form of volatile or non-volatile storage device or medium capable of storing data and/or other computer-readable instructions. Examples of system memory 1516 include, without limitation, Random Access Memory (RAM), Read Only Memory (ROM), flash memory, or any other suitable memory device. Although not required, in certain embodiments computing system 1510 may include both a volatile memory unit (such as, for example, system memory 1516) and a non-volatile storage device (such as, for example, primary storage device 1532, as described in detail below). In one example, one or more of modules 102 from FIG. 1 may be loaded into system memory 1516.

In certain embodiments, exemplary computing system 1510 may also include one or more components or elements in addition to processor 1514 and system memory 1516. For example, as illustrated in FIG. 15, computing system 1510 may include a memory controller 1518, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an Industry Standard Architecture (ISA), Peripheral Component Interconnect (PCI), PCI Express (PCIe), or similar bus) and a network.

Memory controller 1518 generally represents any type or form of device capable of handling memory or data or controlling communication between one or more components of computing system 1510. For example, in certain embodiments memory controller 1518 may control communication between processor 1514, system memory 1516, and I/O controller 1520 via communication infrastructure 1512.

I/O controller 1520 generally represents any type or form of module capable of coordinating and/or controlling the input and output functions of a computing device. For example, in certain embodiments I/O controller 1520 may control or facilitate transfer of data between one or more elements of computing system 1510, such as processor 1514, system memory 1516, communication interface 1522, display adapter 1526, input interface 1530, and storage interface 1534.

Communication interface 1522 broadly represents any type or form of communication device or adapter capable of facilitating communication between exemplary computing system 1510 and one or more additional devices. For example, in certain embodiments communication interface 1522 may facilitate communication between computing system 1510 and a private or public network including additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1522 may also allow computing system 1510 to engage in distributed or remote computing. For example, communication interface 1522 may receive instructions from a remote device or send instructions to a remote device for execution.

As illustrated in FIG. 15, computing system 1510 may also include at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer, as known in the art) for display on display device 1524.

As illustrated in FIG. 15, exemplary computing system 1510 may also include at least one input device 1528 coupled to communication infrastructure 1512 via an input interface 1530. Input device 1528 generally represents any type or form of input device capable of providing input, either computer or human generated, to exemplary computing system 1510. Examples of input device 1528 include, without limitation, a keyboard, a pointing device, a speech recognition device, or any other input device.

As illustrated in FIG. 15, exemplary computing system 1510 may also include a primary storage device 1532 and a backup storage device 1533 coupled to communication infrastructure 1512 via a storage interface 1534. Storage devices 1532 and 1533 generally represent any type or form of storage device or medium capable of storing data and/or other computer-readable instructions. For example, storage devices 1532 and 1533 may be a magnetic disk drive (e.g., a so-called hard drive), a solid state drive, a floppy disk drive, a magnetic tape drive, an optical disk drive, a flash drive, or the like. Storage interface 1534 generally represents any type or form of interface or device for transferring data between storage devices 1532 and 1533 and other components of computing system 1510. In one example, database 120 from FIG. 1 may be stored in primary storage device 1532.

In certain embodiments, storage devices 1532 and 1533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also include other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may also be a part of computing system 1510 or may be a separate device accessed through other interface systems.

Many other devices or subsystems may be connected to computing system 1510. Conversely, all of the components and devices illustrated in FIG. 15 need not be present to practice the embodiments described and/or illustrated herein. The devices and subsystems referenced above may also be interconnected in different ways from that shown in FIG. 15. Computing system 1510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1510. All or a portion of the computer program stored on the computer-readable-storage medium may then be stored in system memory 1516 and/or various portions of storage devices 1532 and 1533. When executed by processor 1514, a computer program loaded into computing system 1510 may cause processor 1514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1510 may be configured as an Application Specific Integrated Circuit (ASIC) adapted to implement one or more of the exemplary embodiments disclosed herein.

Figure 16:
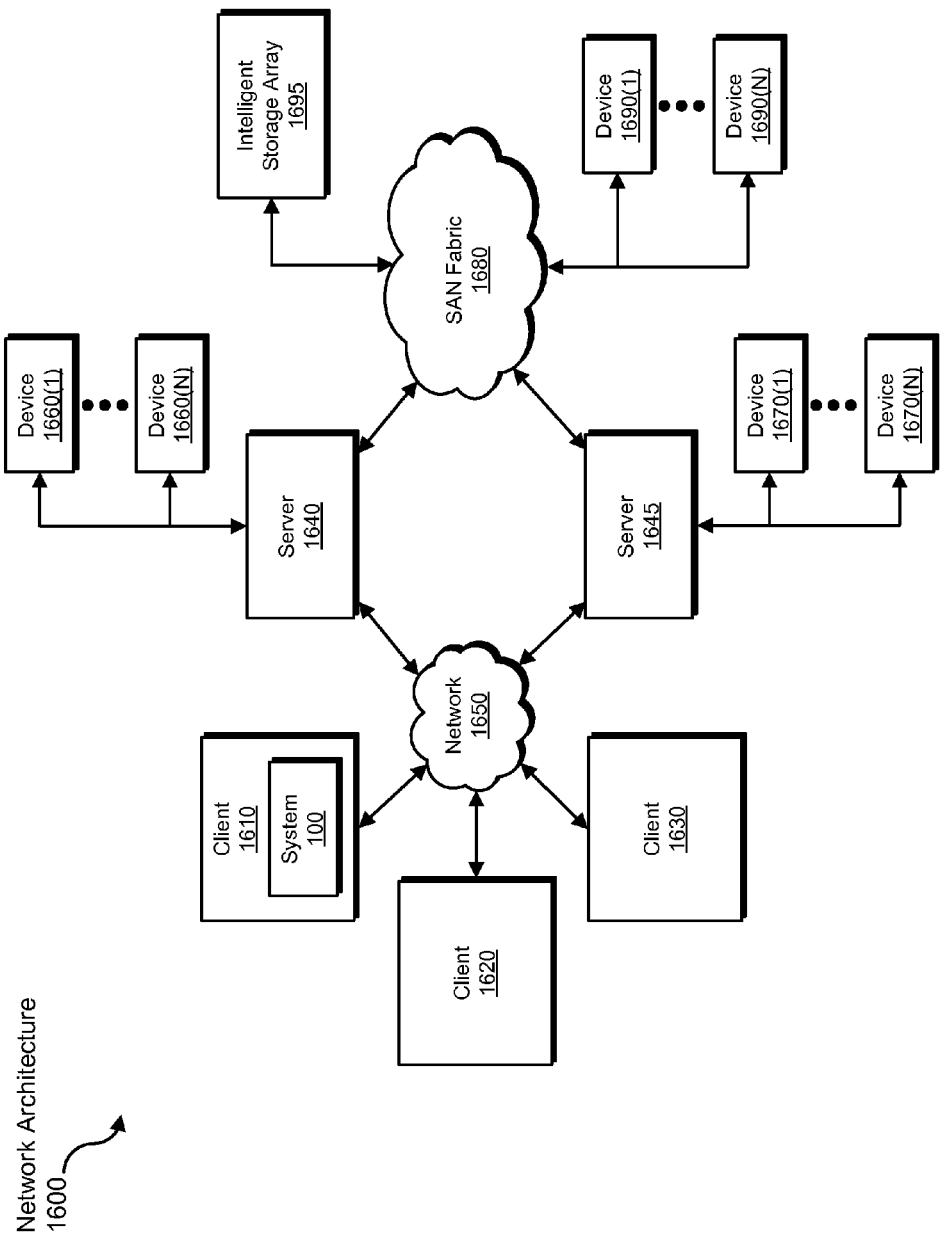
FIG. 16 is a block diagram of an exemplary computing network capable of implementing one or more of the embodiments described and/or illustrated herein.

FIG. 16 is a block diagram of an exemplary network architecture 1600 in which client systems 1610, 1620, and 1630 and servers 1640 and 1645 may be coupled to a network 1650. As detailed above, all or a portion of network architecture 1600 may perform and/or be a means for performing, either alone or in combination with other elements, one or more of the identifying, selecting, creating, detecting, performing, deleting, determining, causing, moving, and receiving steps disclosed herein. All or a portion of network architecture 1600 may also be used to perform and/or be a means for performing other steps and features set forth in the instant disclosure.

Client systems 1610, 1620, and 1630 generally represent any type or form of computing device or system, such as exemplary computing system 1510 in FIG. 15. Similarly, servers 1640 and 1645 generally represent computing devices or systems, such as application servers or database servers, configured to provide various database services and/or run certain software applications. Network 1650 generally represents any telecommunication or computer network including, for example, an intranet, a WAN, a LAN, a PAN, or the Internet. In one example, client systems 1610, 1620, and/or 1630 and/or servers 1640 and/or 1645 may include all or a portion of system 100 from FIG. 1.

As illustrated in FIG. 16, one or more storage devices 1660(1)-(N) may be directly attached to server 1640. Similarly, one or more storage devices 1670(1)-(N) may be directly attached to server 1645. Storage devices 1660(1)-(N) and storage devices 1670(1)-(N) generally represent any type or form of storage device or medium capable of storing data and/or other computer-readable instructions. In certain embodiments, storage devices 1660(1)-(N) and storage devices 1670(1)-(N) may represent Network-Attached Storage (NAS) devices configured to communicate with servers 1640 and 1645 using various protocols, such as Network File System (NFS), Server Message Block (SMB), or Common Internet File System (CIFS).

Servers 1640 and 1645 may also be connected to a Storage Area Network (SAN) fabric 1680. SAN fabric 1680 generally represents any type or form of computer network or architecture capable of facilitating communication between a plurality of storage devices. SAN fabric 1680 may facilitate communication between servers 1640 and 1645 and a plurality of storage devices 1690(1)-(N) and/or an intelligent storage array 1695. SAN fabric 1680 may also facilitate, via network 1650 and servers 1640 and 1645, communication between client systems 1610, 1620, and 1630 and storage devices 1690(1)-(N) and/or intelligent storage array 1695 in such a manner that devices 1690(1)-(N) and array 1695 appear as locally attached devices to client systems 1610, 1620, and 1630. As with storage devices 1660(1)-(N) and storage devices 1670(1)-(N), storage devices 1690(1)-(N) and intelligent storage array 1695 generally represent any type or form of storage device or medium capable of storing data and/or other computer-readable instructions.

In certain embodiments, and with reference to exemplary computing system 1510 of FIG. 15, a communication interface, such as communication interface 1522 in FIG. 15, may be used to provide connectivity between each client system 1610, 1620, and 1630 and network 1650. Client systems 1610, 1620, and 1630 may be able to access information on server 1640 or 1645 using, for example, a web browser or other client software. Such software may allow client systems 1610, 1620, and 1630 to access data hosted by server 1640, server 1645, storage devices 1660(1)-(N), storage devices 1670(1)-(N), storage devices 1690(1)-(N), or intelligent storage array 1695. Although FIG. 16 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1640, server 1645, storage devices 1660(1)-(N), storage devices 1670(1)-(N), storage devices 1690(1)-(N), intelligent storage array 1695, or any combination thereof. All or a portion of one or more of the exemplary embodiments disclosed herein may also be encoded as a computer program, stored in server 1640, run by server 1645, and distributed to client systems 1610, 1620, and 1630 over network 1650.

As detailed above, computing system 1510 and/or one or more components of network architecture 1600 may perform and/or be a means for performing, either alone or in combination with other elements, one or more steps of an exemplary method for managing affinity rules in virtual-machine environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application affinity rule to be transformed, transform the application affinity rule into a virtual-machine affinity rule, output a result of the transformation to a system for managing virtual machines and/or cluster nodes, use the result of the transformation to dynamically select a hypervisor on which to run an application associated with the application affinity rule, and store the result of the transformation to a database configured to store virtual-machine affinity rules. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing affinity rules in virtual-machine environments, at least a portion of the method being performed by a computing device comprising at least one processor, the method comprising:
   identifying a first application configured to run on a first virtual machine, the first virtual machine configured to run on one of a plurality of hypervisors;
   identifying a second application configured to run on a second virtual machine or a third virtual machine, the second virtual machine and the third virtual machine each configured to run on one of the plurality of hypervisors;
   identifying an application affinity rule between the first application and the second application, the application affinity rule indicating whether the first application and the second application should run on a same hypervisor within the plurality of hypervisors;
   selecting, based at least in part on which hypervisor among the plurality of hypervisors is running the first application, a hypervisor from among the plurality of hypervisors on which to run the second application and the second virtual machine that satisfies the application affinity rule between the first application and the second application by:
      creating a virtual-machine affinity rule between the first virtual machine and the second virtual machine that reflects the application affinity rule between the first application and the second application, the virtual-machine affinity rule between the first virtual machine and the second virtual machine indicating whether the first virtual machine and the second virtual machine should run on the same hypervisor within the plurality of hypervisors;
   detecting that the second application has moved from the second virtual machine to the third virtual machine;
   in response to detecting that the second application has moved from the second virtual machine to the third virtual machine, performing at least one of:
      deleting the virtual-machine affinity rule between the first virtual machine and the second virtual machine;
      creating a virtual-machine affinity rule between the first virtual machine and the third virtual machine that reflects the application affinity rule between the first application and the second application, the virtual-machine affinity rule between the first virtual machine and the third virtual machine indicating whether the first virtual machine and the second virtual machine should run on the same hypervisor within the plurality of hypervisors.

2. The method of claim 1, wherein the first virtual machine, the second virtual machine, and the third virtual machine comprise a cluster of virtual machines configured to run the first application and the second application.

3. The method of claim 1, wherein selecting the hypervisor from among the plurality of hypervisors on which to run the second application comprises:
   determining that the first application is running on the hypervisor;
   determining that the application affinity rule between the first application and the second application indicates that the first application and the second application should run on the same hypervisor within the plurality of hypervisors;
   causing, based at least in part on determining that the first application is running on the hypervisor and the application affinity rule between the first application and the second application, the second application to run on the hypervisor.

4. The method of claim 3, wherein:
   determining that the first application is running on the hypervisor comprises:
   determining that the first application is running on the first virtual machine;
   determining that the first virtual machine is running on the hypervisor;
   causing the second application to run on the hypervisor comprises:
   determining that the second virtual machine is running on the hypervisor;
   causing, based at least in part on determining that the second virtual machine is running on the hypervisor, the second application to run on the second virtual machine.

5. The method of claim 3, wherein causing the second application to run on the hypervisor comprises:
   determining that there is no virtual machine running on the hypervisor on which to run the second application;

causing, based at least in part on determining that there is no virtual machine running on the hypervisor on which to run the second application, the second application to run on the second virtual machine, wherein the second virtual machine is running on an additional hypervisor from among the plurality of hypervisors;

creating a virtual-machine affinity rule between the first virtual machine and the second virtual machine that reflects the application affinity rule between the first application and the second application, the virtual-machine affinity rule between the first virtual machine and the second virtual machine indicating that the first virtual machine and the second virtual machine should run on the same hypervisor within the plurality of hypervisors.

6. The method of claim 1, wherein the second application is configured to run within a cluster environment.

7. The method of claim 1, wherein identifying the application affinity rule between the first application and the second application comprises:

receiving a request that indicates that the first application and the second application should run on the same hypervisor within the plurality of hypervisors;

creating, in response to the request, the application affinity rule between the first application and the second application, the application affinity rule indicating that the first application and the second application should run on the same hypervisor within the plurality of hypervisors.

8. A system for managing affinity rules in virtual-machine environments, the system comprising:

an application-identifying module, stored in memory, that:
identifies a first application configured to run on a first virtual machine, the first virtual machine configured to run on one of a plurality of hypervisors;
identifies a second application configured to run on a second virtual machine or a third virtual machine, the second virtual machine and the third virtual machine each configured to run on one of the plurality of hypervisors;

a rule-identifying module, stored in memory, that identifies an application affinity rule between the first application and the second application, the application affinity rule indicating whether the first application and the second application should run on a same hypervisor within the plurality of hypervisors;

a selecting module, stored in memory, that:
selects, based at least in part on which hypervisor among the plurality of hypervisors is running the first application, a hypervisor from among the plurality of hypervisors on which to run the second application and the second virtual machine that satisfies the application affinity rule between the first application and the second application by:
creating a virtual-machine affinity rule between the first virtual machine and the second virtual machine that reflects the application affinity rule between the first application and the second application, the virtual-machine affinity rule between the first virtual machine and the second virtual machine indicating whether the first virtual machine and the second virtual machine should run on the same hypervisor within the plurality of hypervisors;
detects that the second application has moved from the second virtual machine to the third virtual machine;
performs, in response to detecting that the second application has moved from the second virtual machine to the third virtual machine, at least one of:
deleting the virtual-machine affinity rule between the first virtual machine and the second virtual machine;
creating a virtual-machine affinity rule between the first virtual machine and the third virtual machine that reflects the application affinity rule between the first application and the second application, the virtual-machine affinity rule between the first virtual machine and the third virtual machine indicating whether the first virtual machine and the second virtual machine should run on the same hypervisor within the plurality of hypervisors;

at least one processor configured to execute the application-identifying module, the rule-identifying module, and the selecting module.

9. The system of claim 8, wherein the first virtual machine, the second virtual machine, and the third virtual machine comprise a cluster of virtual machines configured to run the first application and the second application.

10. The system of claim 8, wherein the selecting module is programmed to select the hypervisor from among the plurality of hypervisors on which to run the second application by:

determining that the first application is running on the hypervisor;
determining that the application affinity rule between the first application and the second application indicates that the first application and the second application should run on the same hypervisor within the plurality of hypervisors;
causing, based at least in part on determining that the first application is running on the hypervisor and the application affinity rule between the first application and the second application, the second application to run on the hypervisor.

11. The system of claim 10, wherein the selecting module is programmed to:

determine that the first application is running on the hypervisor by:
determining that the first application is running on the first virtual machine;
determining that the first virtual machine is running on the hypervisor;
cause the second application to run on the hypervisor by:
determining that the second virtual machine is running on the hypervisor;
causing, based at least in part on determining that the second virtual machine is running on the hypervisor, the second application to run on the second virtual machine.

12. The system of claim 10, wherein the selecting module is programmed to cause the second application to run on the hypervisor by:

determining that there is no virtual machine running on the hypervisor on which to run the second application;
causing, based at least in part on determining that there is no virtual machine running on the hypervisor on which to run the second application, the second application to run on the second virtual machine, wherein the second virtual machine is running on an additional hypervisor from among the plurality of hypervisors;
creating a virtual-machine affinity rule between the first virtual machine and the second virtual machine that reflects the application affinity rule between the first application and the second application, the virtual-machine affinity rule between the first virtual machine and the second virtual machine indicating that the first virtual machine and the second virtual machine should run on the same hypervisor within the plurality of hypervisors.

13. The system of claim 8, wherein the second application is configured to run within a cluster environment.

14. A non-transitory computer-readable medium comprising one or more computer-executable instructions that, when executed by at least one processor of a computing device, cause the computing device to:
- identify a first application configured to run on a first virtual machine, the first virtual machine configured to run on one of a plurality of hypervisors;
- identify a second application configured to run on a second virtual machine or a third virtual machine, the second virtual machine and the third virtual machine each configured to run on one of the plurality of hypervisors;
- identify an application affinity rule between the first application and the second application, the application affinity rule indicating whether the first application and the second application should run on a same hypervisor within the plurality of hypervisors;
- select, based at least in part on which hypervisor among the plurality of hypervisors is running the first application, a hypervisor from among the plurality of hypervisors on which to run the second application and the second virtual machine that satisfies the application affinity rule between the first application and the second application by:
  - creating a virtual-machine affinity rule between the first virtual machine and the second virtual machine that reflects the application affinity rule between the first application and the second application, the virtual-machine affinity rule between the first virtual machine and the second virtual machine indicating whether the first virtual machine and the second virtual machine should run on the same hypervisor within the plurality of hypervisors;
- detect that the second application has moved from the second virtual machine to the third virtual machine;
- perform, in response to detecting that the second application has moved from the second virtual machine to the third virtual machine, at least one of:
  - deleting the virtual-machine affinity rule between the first virtual machine and the second virtual machine;
  - creating a virtual-machine affinity rule between the first virtual machine and the third virtual machine that reflects the application affinity rule between the first application and the second application, the virtual-machine affinity rule between the first virtual machine and the third virtual machine indicating whether the first virtual machine and the second virtual machine should run on the same hypervisor within the plurality of hypervisors.

* * * * *